United States Patent
Devaux et al.

(10) Patent No.: US 6,609,839 B1
(45) Date of Patent: Aug. 26, 2003

(54) DEVICE INCLUDING A SATURABLE ABSORBER FOR REGENERATING A WAVELENGTH-DIVISION MULTIPLEX SIGNAL

(75) Inventors: Fabrice Devaux, Montrouge (FR); Alexandre Shen, Nozay (FR); Philippe Pagnod-Rossiaux, St. Germain les Arpajon (FR); Paul Salet, Clamart (FR); Christophe Starck, Ste-Genevieve-des-Bois (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/411,228

(22) Filed: Oct. 4, 1999

(30) Foreign Application Priority Data

Oct. 5, 1998 (FR) .............................. 98 12430

(51) Int. Cl.$^7$ ................................................ H01S 3/30
(52) U.S. Cl. .............................. 398/87; 398/88; 398/96
(58) Field of Search ................................ 359/130, 152, 359/117, 161; 372/11, 18, 19

(56) References Cited

U.S. PATENT DOCUMENTS

| | | | | |
|---|---|---|---|---|
| 5,237,577 A | * | 8/1993 | Keller et al. .................... | 372/11 |
| 5,519,526 A | * | 5/1996 | Chua et al. ................... | 359/152 |
| 5,692,077 A | | 11/1997 | Stone et al. .................... | 385/16 |
| 6,072,811 A | * | 6/2000 | Fermann et al. ............... | 372/11 |
| 6,097,741 A | * | 8/2000 | Lin et al. ........................ | 372/6 |
| 6,252,892 B1 | * | 6/2001 | Jiang et al. .................... | 372/11 |

FOREIGN PATENT DOCUMENTS

EP 0 782 284 A2 7/1997

OTHER PUBLICATIONS

A. Prasad et al, "Ultrafast response times and enhanced optical nonlinearity in beryllium–doped low–temperature–grown GaAs", Technical Digest. Summaries of Papers Presented at the Conference on Lasers and Electro–Optics, Conference Edition, 1998 Technical Digest Series, vol. 6 (IEEE Cat. No. 98CH36178), Technical Digest Summaries of Papers Presented at the Conference on LASE, pp. 535–536, XP002104972.

E. L. Delphon et al, "Ultrafast excitonic nonlinearities in ion–implanted InGaAs/InAlAs quantum wells", Technical Digest, Summaries of Papers Presented at the Conference on Lasers and Electro–Optics. Conference Edition, 1998 Technical Digest Series, vol. 6, (IEEE Cat. No. 98CH36178), Technical Digest Summaries of Papers Presented at the Conference on LASE, p. 536, XP002104973.

* cited by examiner

Primary Examiner—Leslie Pascal
Assistant Examiner—David C. Payne
(74) Attorney, Agent, or Firm—Sughrue Mion, PLLC

(57) ABSTRACT

In a device for regenerating a wavelength-division multiplex optical signal, the optical signal to be regenerated comes from an optical fiber and is injected back into the same optical fiber or into another fiber. The device comprises at least one dispersive medium for receiving the wavelength-division multiplex signal and emitting a corresponding dispersed wave into a free space and a saturable absorber which receives the dispersed wave and transmits a corresponding regenerated wave.

17 Claims, 4 Drawing Sheets

FIG_1
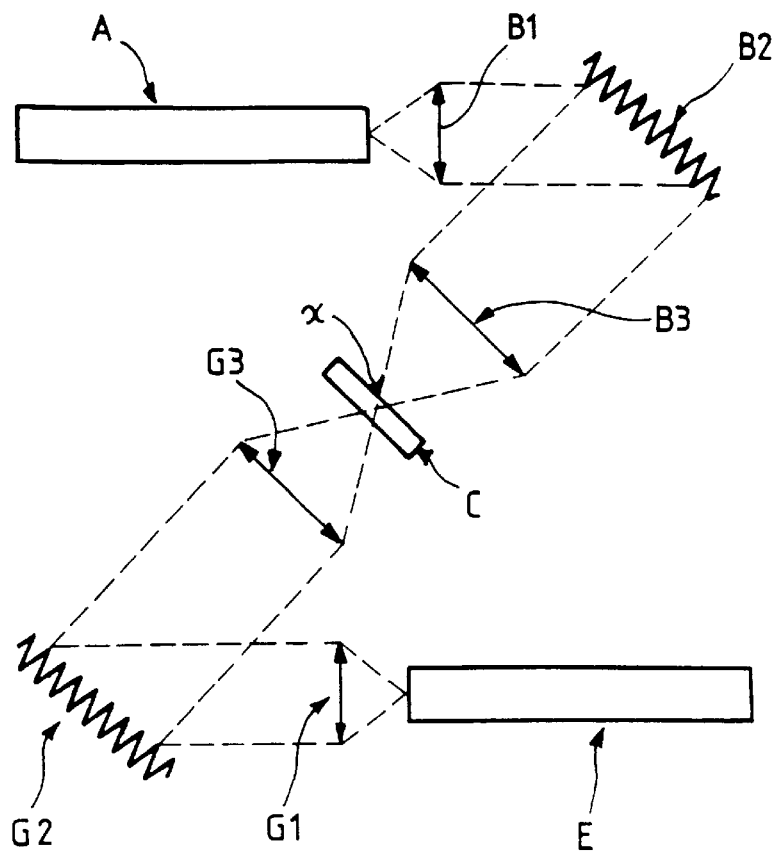
FIG_2
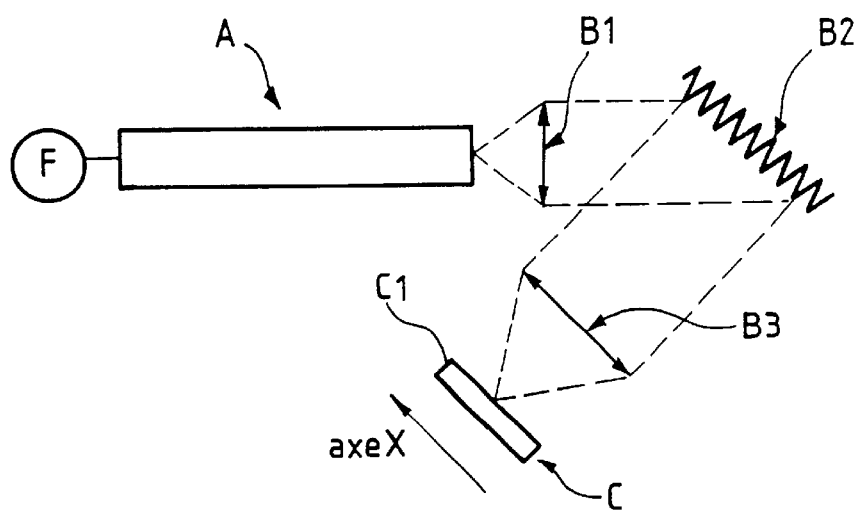

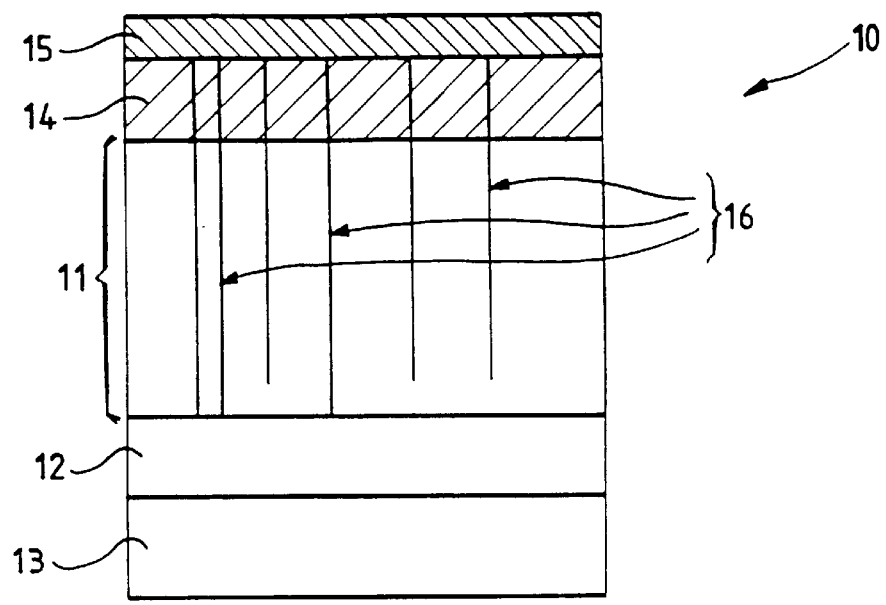
FIG_3a
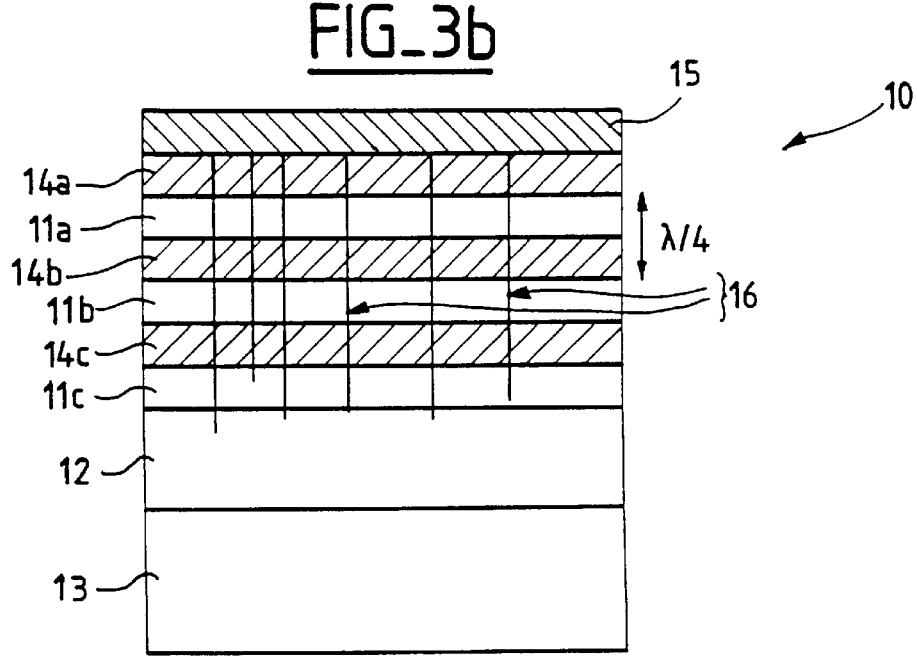
FIG_3b

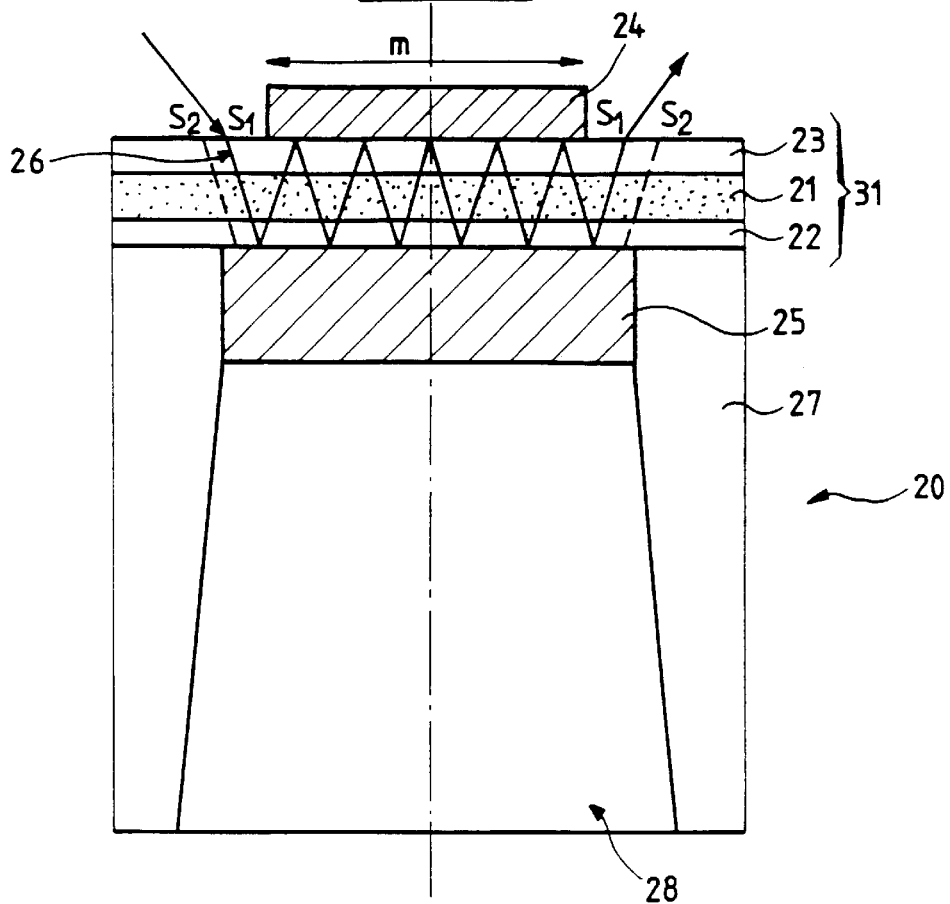
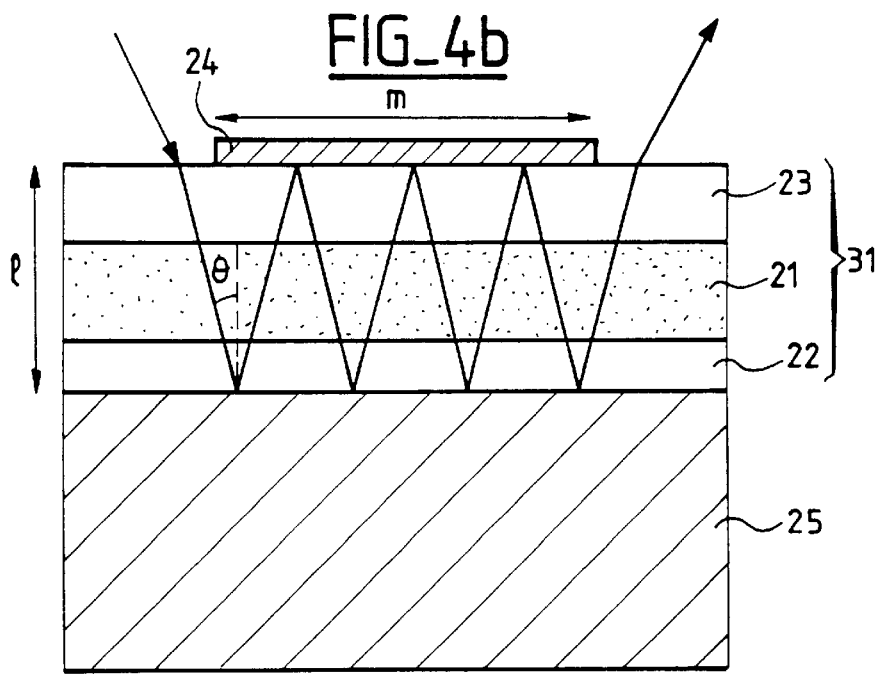

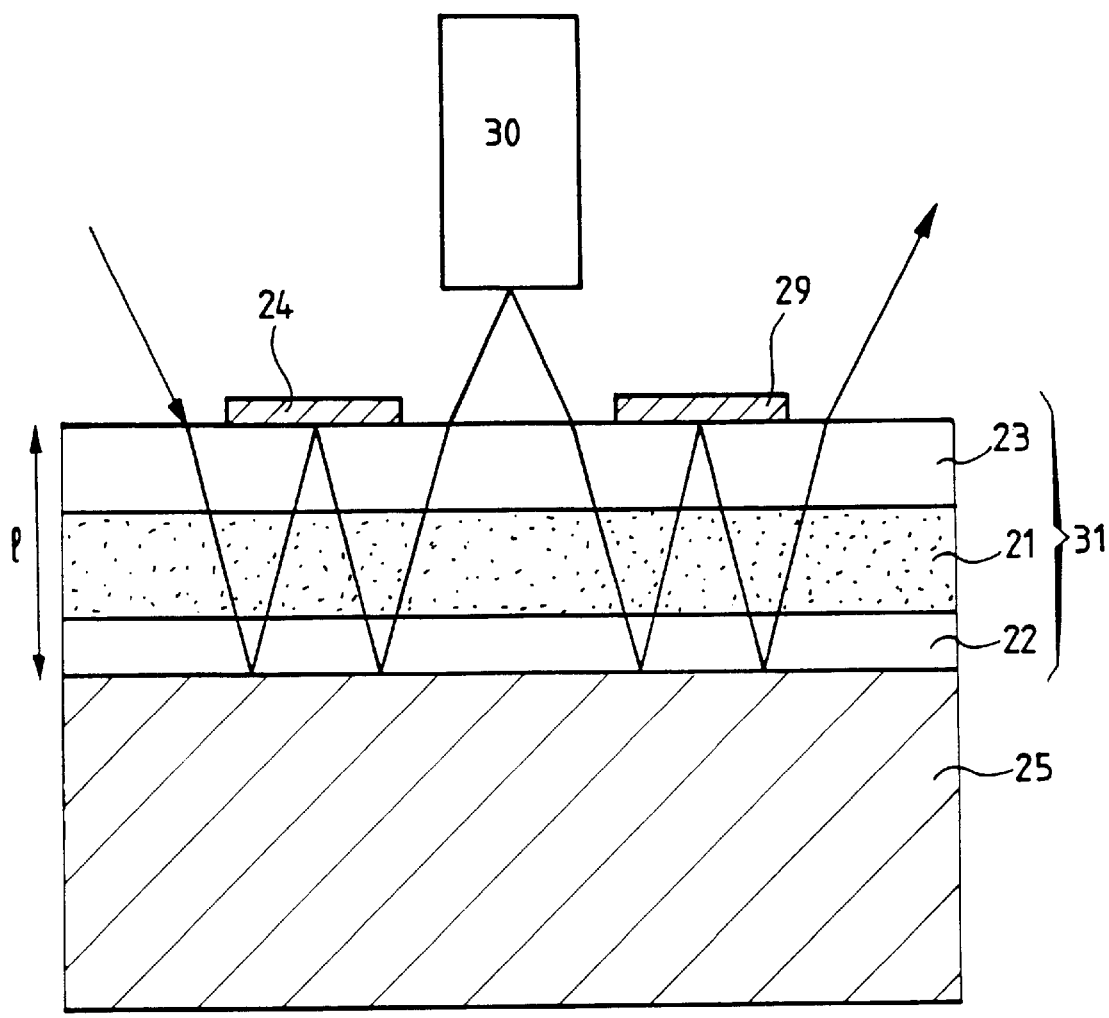
FIG_4c

DEVICE INCLUDING A SATURABLE ABSORBER FOR REGENERATING A WAVELENGTH-DIVISION MULTIPLEX SIGNAL

BACKGROUND OF THE INVENTION

1. Field of the Invention

The present invention concerns a device for regenerating a wavelength-division multiplex (WDM) optical signal. It applies in particular to fiber optic systems for transmitting binary data.

2. Description of the Prior Art

An optical signal which propagates in optical fibers, in communication nodes and other optical devices used in telecommunications, is subject to optical losses and is modified. It would therefore seem necessary to regenerate the signal to compensate for accumulated unwanted noise, distortion of the signal and time shifting.

The regenerators currently available, whether of the optoelectronic or all-optical type, cannot easily regenerate a multiplex signal in parallel on all the WDM channels.

Opto-electronic regenerators available off the shelf comprise an electronic conversion—electronic processing—optical conversion system. This type of device detects the optical signal before processing it in the electronic domain. This electronic processing of the signal compensates for distortion of the signal and effects what is known as "2R" regeneration (Reshaping, Resynchronization). The regenerated signal can then be transmitted by a laser which amplifies the signal. This achieves what is called "3R" regeneration (Reshaping, Resynchronization, Re-amplification).

However, this type of device cannot be used directly to regenerate a WDM signal because it detects the total luminous power of the signal, i.e. the power of all the WDM channels.

Consequently, in order to be able to process all the channels, they must first be wavelength-division demultiplexed. In this case, regenerating a wavelength-division multiplex signal therefore entails using an opto-electronic regenerator for each WDM channel. It is therefore necessary to use as many regenerators as there are WDM channels.

Other all-optical regenerator devices have been designed. These devices are guided wave optical circuits. They include a waveguide stripe having non-linear properties and into which the light signal to be regenerated, which comes from an optical fiber, must be injected. To achieve this, the waveguide stripe and the optical fiber must be aligned. This solution requires as many fiber splices as there are WDM channels. For example, if the optical signal to be regenerated comprises 16 WDM channels, either the same number of dies each having a waveguide stripe or an optical integrated circuit comprising 16 waveguide stripes is required for the 16 channels of the optical signal to be regenerated. In either case, this solution is much too costly.

The invention overcomes the aforementioned drawbacks in that it proposes an all-optical regenerator that is not based on the guided wave principle and avoids the problem of multiple fiber splices according to the number of channels. Moreover, by virtue of the invention, a single regenerator can be used to regenerate the various beams from the various WDM channels on the optical fiber. Another aim of the invention is for the regenerator to be able to regenerate WDM channels carried by a greater number of wavelengths that are not predefined. The invention avoids the use of a regenerator for each WDM channel and circumvents synchronization constraints on signal processing.

SUMMARY OF THE INVENTION

The invention relates more particularly to a device for regenerating a wavelength-division multiplex optical signal, which device comprises:

- a dispersive medium for receiving the wavelength-division multiplex signal and emitting a corresponding dispersed wave into a free space, and
- a saturable absorber disposed to receive the dispersed wave on a first face and to transmit a corresponding regenerated wave.

The device of the invention can regenerate the multiplex optical signal, and in particular reshape it, for all the WDM channels simultaneously and with no synchronization constraints. The wave from an optical fiber is focused onto a saturable absorber plate at points which differ according to the wavelengths of the channels, because of the dispersive medium of the device. The device of the invention can therefore separate and regenerate the WDM channels over all of a continuous band of wavelengths.

According to another feature of the invention, the device further comprises another dispersive medium for recombining the dispersed and regenerated wave at the exit from the saturable absorber.

The invention also concerns a saturable absorber which can be used in the regenerator device. Saturable absorbers available off the shelf are made by two different methods.

A first method entails growing the active layer, i.e. the absorbent layer, at low temperature. The active layer is generally made from a ternary material, for example AlGaAs or InGaAs, and includes quantum wells. However, aggregates form in the material during growth at low temperature and degrade the excitonic line. The excitonic line can become sufficiently degraded to prevent recombination of the free carriers. This low temperature growth method requires additional doping with Be (Beryllium) to prevent excessive degradation of the excitonic line, but this doping increases the cost of the saturable absorber.

A second method entails ionic irradiation of the absorbent layer to introduce recombination centers and to enable the carriers created by the photons to recombine very quickly. Ionic implantation reduces the lifetime $\tau$ of the carriers, i.e. increases the speed of recombination. However, ionic irradiation also tends to widen the excitonic line, which reduces the recombination yield. A rate of ionic implementation must therefore be found to achieve a compromise between a sufficiently low carrier lifetime $\tau$, in the order of one picosecond (ps), and a reasonable combination yield, i.e. few residual losses.

What is more, in conventional saturable absorbers, the absorbing layer is relatively thick. Its thickness is in the range from 2 $\mu$m to 5 $\mu$m. Growing this layer with multiple quantum wells epitaxially to this thickness also contributes to increasing the manufacturing cost of the saturable absorbers.

To avoid all the above problems, the invention proposes two embodiments of a saturable absorber.

The first embodiment entails controlled introduction of dislocations into the crystal structure of the active layer, to create artificial recombination centers. This eliminates the need for ionic irradiation, which is a complex and costly technique. To this end, a material having a lattice mismatch with the material of the protection layer, i.e. InP in the example given here, is grown on top of the absorbing layer, which is covered with a protective layer of InP, for example.

The material grown on the InP is gallium arsenide (GaAs), for example. Growing a material of this kind (GaAs) having a lattice mismatch with the InP creates tensions at the interface between the two materials. The tensions cause the appearance of dislocations in the InP protective layer which propagate into the active layer.

The second embodiment, which can complement the first one, consists in reducing the thickness of the active layer to reduce the cost of manufacturing the saturable absorber. To this end, it entails placing two mirrors on respective opposite sides of and parallel to the active layer. The light wave passing through the active layer therefore undergoes multiple reflections and is therefore absorbed several times. The thickness of the active layer can therefore be reduced by a factor corresponding to the number of reflections.

Other features and advantages of the invention will become apparent on reading the following description which is given by way of non-limiting illustrative example only and with reference to the accompanying drawings.

BRIEF DESCRIPTION OF THE DRAWINGS

FIG. 1 shows a first embodiment of a regenerator in accordance with the invention.

FIG. 2 shows a second embodiment of a regenerator in accordance with the invention.

FIGS. 3a and 3b are diagrams showing two variants of a first embodiment of a saturable absorber of the invention.

FIG. 4a is a diagram showing a second embodiment of a saturable absorber of the invention.

FIG. 4b is a diagram showing a variant of the active part of the multiple reflection saturable absorber from FIG. 4a.

FIG. 4c is a diagram showing another variant of the active part of the multiple reflection saturable absorber from FIG. 4a.

DETAILED DESCRIPTION OF THE PREFERRED EMBODIMENTS

FIG. 1 is a diagram showing a first embodiment of a regenerator in accordance with the invention. In this example, a wavelength-division multiplex optical signal from an optical fiber A is regenerated by means of the device in accordance with the invention and then injected into an output optical fiber E.

The regenerator shown in FIG. 1 includes a dispersive medium adapted to receive the wavelength-division multiplex signal from the optical fiber A and to emit a corresponding dispersive wave into a free space. That free space is at least two-dimensional. The dispersive medium comprises two lenses B1 and B3 on respective opposite sides of a grating B2, for example.

More generally, the dispersive element can have various prior art configurations. It can be a lens-grating combination, or a prism, for example.

The regenerator further includes a saturable absorber C disposed to receive the dispersive wave and to transmit a corresponding regenerated wave. The saturable absorber is described in more detail below with reference to FIGS. 3a and 3b.

The optical signal from the fiber A is projected by the lens B1 onto the grating B2. The grating B2 splits the optical signal into a plurality of light beams having different wavelengths and deflects each light beam by an angle that depends on the dispersion coefficient D of the grating and the wavelength of said beam. The second lens B3 at the exit from the grating B2 then focuses each beam deflected by the grating to form a spot on the saturable absorber C. The spot associated with each light beam is focused on the saturable absorber C at a location x that depends on the dispersion coefficient of the grating B2 and on the wavelength of the deflected beam. A spot focusing point on the saturable absorber C is therefore associated with each wavelength of the optical signal.

The multiplex optical signal can be split into beams with different wavelengths continuously by this single regenerator. In this case, it is therefore unnecessary to use a regenerator for each WDM channel and to regenerate the beams synchronously. The device of the invention provides parallel and continuous regeneration of a wavelength-division multiplex optical signal.

The regenerator shown in the FIG. 1 diagram further includes another dispersive medium adapted to recombine the dispersed and regenerated wave at the exit from the saturable absorber C. The regenerated and recombined wave is then injected into the output fiber E. In this case, the second dispersive medium can likewise comprise two lenses G1, G3 on respective opposite sides of a grating G2.

The dispersive media B1, B2, B3 and G1, G2, G3 and the saturable absorber C are preferably fixed into a housing. For simplicity, this housing is not shown in FIG. 1.

FIG. 2 is a diagram showing a second embodiment of a regenerator in accordance with the invention. The same reference numerals as used in FIG. 1 are used in FIG. 2 to denote the same components. The second regenerator reflects the regenerated signal back into the input optical fiber A. This type of regenerator can be advantageous in some cases for reasons of cost and overall size.

To be able to reflect the regenerated signal, the saturable absorber plate C has a reflective coating or a Bragg mirror on its second face C1. The second face is generally perpendicular to the direction of propagation of the incoming wave that it receives.

In this case, it is also necessary to provide a spatial splitter, for example a circulator F, at the other end of the optical fiber A. The circulator F separates the optical signal to be regenerated, which travels in one direction, from the regenerated optical signal, which travels in the opposite direction.

In one variant, the saturable absorber used is a multiple reflection absorber as described below with reference to FIGS. 4a through 4c.

Each light beam of a WDM channel from the fiber A is focused at a point on the saturable absorber C. The position x of the focusing point is defined by the dispersion coefficient D of the grating B2 and also depends on the wavelength of the corresponding light beam. The position x on the axis X of the saturable absorber C is therefore given by the following equation: $x = D\lambda + K$, where D is the dispersion coefficient of the grating B2, $\lambda$ is the wavelength of the light beam deflected by the grating B2 and focused by the lens B3 at the point x, and K is a constant.

The higher the luminous power, the more transparent the material of the saturable absorber. The optical signal from each channel being power modulated, when the saturable absorber C receives an optical power pulse it becomes transparent and allows the pulse to pass through it. On the other hand, the saturable absorber C is absorbent for the unwanted noise with lower power between pulses, and consequently attenuates the noise.

Consequently, the regenerator of the invention reshapes the signal and improves the extinction ratio. Also, if a fiber amplifier precedes the device of the invention, "2R" regeneration (Reshaping and Re-amplification) is achieved.

The invention also concerns the production of a saturable absorber for use in the regenerator of the invention. A first embodiment of the saturable absorber, shown diagrammatically in FIGS. 3a and 3b, is more particularly suited to fabrication of the regenerator of the invention shown in FIG. 1. A second embodiment of the saturable absorber, shown diagrammatically in FIGS. 4a through 4c, is more particularly suited to fabrication of the second regenerator of the invention shown in FIG. 2. Of course, the use of these saturable absorbers is not restricted to the regenerator of the invention, and they can be used in other types of signal regenerator device, in optical gates or in zig-zag waveguides for electro-absorbent modulators.

In the first embodiment of the saturable absorber 10, shown in FIGS. 3a and 3b, controlled growth of dislocations 16 in the crystal structure of the active layer (or absorbent layer) 11 introduces artificial recombination centers therein. The active layer 11 of the absorber 10 is generally made from a ternary material, for example InGaAs or AlGaAs, and includes quantum wells. It is deposited on a buffer layer 12 in turn deposited on a substrate 13. It is covered with a protective layer 14, generally of a III-V material, more particularly indium phosphide (InP). To create the dislocations 16 in the crystal structure of the absorbent layer 11, and to control their density, a material 15 is grown on the protective layer 14 which has a lattice mismatch with the material of the protective layer 14, which is InP in this example. The material 15 is metamorphic gallium arsenide (GaAs), for example. The lattice parameter $a_{GaAs}$ of GaAs, which is equal to 0.565 nm, is different from the lattice parameter $a_{InP}$ of InP, which is equal to 0.587 nm. It is this difference in their lattice parameters which is responsible for the lattice mismatch between the two materials.

The lattice mismatch between the two materials creates tensions at the interface between the InP protective layer 14 and the GaAs top layer 15. These tensions cause dislocations in the InP layer 14 that propagate into the active layer 11.

The density of the defects created is related to the lifetime of the carriers and to the recombination speed by the following equations:

(1) $L = \tau v/2$ when the defects are created in a one-dimensional medium, or (2) $L = \tau v$ when the defects are created in a two-dimensional medium, where L represents the reciprocal of the linear density of defects, $\tau$ represents the lifetime of the carriers, and v represents the recombination speed.

The density of the defects to be incorporated into the active layer to obtain this result is calculated from the above equations, the aim being to obtain a fast saturable absorber, i.e. one incorporating carriers with a short lifetime, in the order of one picosecond. Thus, to obtain a lifetime $\tau=1$ ps, the reciprocal L of the linear density of defects must be equal to 50 nm and to obtain a lifetime $\tau=1.2$ ps, L must be equal to 60 nm.

FIG. 3b is a diagram showing one variant of this saturable absorber. In this variant, the active layer 11 is divided into a plurality of portions 11a, 11b, 11c of ternary material incorporating multiple quantum welds separated from each other by InP protective layers 14a, 14b, 14c. The active layer portions 11a, 11b, 11c are separated from each other by a distance $\tau/4$. Dividing the absorbent layer 11 in this way increases the effectiveness of the absorption. Light entering perpendicularly to the surface of the device creates interference fringes whose maxima are separated from each other by $\tau/4$ and situated in the portions 11a, 11b, 11c of the absorbent layer.

The GaAs material can be doped to favour the formation of dislocations in the active layer 11 and to avoid depositing the GaAs top layer 15 to an excessive thickness, which would increase the cost of manufacturing the absorber. Table I at the end of the description sets out the results obtained when a 290 nm thick GaAs layer 15 is grown on an InP protective layer 14 (or 14a) at a temperature of 450° C., as a function of the degree of doping of the GaAs layer.

From Table I, if the GaAs layer is doped with p type carriers (sample 3), the structure of the active layer 11 does not include any defects, because they do not propagate into that layer, and the excitonic line has a narrow profile. This type of doping cannot create dislocations in the active layer.

If the GaAs layer is very strongly doped with n type carriers (sample 1, n doping $5.10^{18}$ cm$^{-3}$), the majority of the defects are in the active layer 11 and the excitonic line is widened too much to obtain a good recombination yield.

The result to be obtained corresponds to sample 2 from table I, for which a reasonable number of defects are created in the active layer and the excitonic line is not widened too much. The presence of dislocations in the active layer is therefore related not only to the thickness of the GaAs layer (the defect density increases with the thickness of the GaAs layer), but also with the degree of doping of the GaAs layer.

More generally, controlling the growth of dislocations in the active layer depends on the conditions for growing the GaAs layer 15, and in particular on the temperature cycle during its growth, its thickness and the degree of doping. The density of dislocations in the active layer also depends on the thickness of the InP protective layer 14. This fact can be used to adjust the density of dislocations in the active layer.

The temperature for growing the GaAs layer 15 is preferably in the range from 400° C. to 500° C. The thickness of the layer 15 is preferably greater than 0.1 $\mu$m, the doping of the GaAs layer 15 with n type carriers is preferably in the range from 0 up to $4.10^{18}$ cm$^{-3}$, and the thickness of the protective layer 14 is preferably in the range from 0 up to 1 $\mu$m.

The saturable absorber with dislocations just described can be used in the first regenerator of the invention shown in FIG. 1.

The diagrams in FIGS. 4a through 4c show a second embodiment of the saturable absorber of the invention. This embodiment entails placing at least two mirrors 24, 25 on respective opposite sides of and parallel to the active layer 21, in order to cause multiple reflections of the light wave passing through the active layer. The active layer 21 is conventionally made from a ternary material, in particular InGaAs or AlGaAs, and incorporates multiple quantum wells. Because of the multiple reflections, the light wave passes several times through the active layer 21, where it is absorbed. Consequently, the multiple reflections enable the thickness of the active layer to be reduced. If a saturable absorber causes ten reflections of the light wave, for example, the wave is absorbed ten times in succession by the active layer and the result obtained with this saturable absorber is therefore equivalent to the result obtained with a conventional saturable absorber with an active layer ten times thicker. Reducing the thickness of the absorbent layer 21 reduces the epitaxial growth time and therefore reduces the cost of manufacturing the saturable absorber.

The FIG. 4a diagram shows the structure of the saturable absorber 20. It comprises an active layer 21, i.e. a ternary material absorbent layer with multiple quantum wells. The active layer 21 is deposited onto a buffer layer 22, for example of InP, in turn deposited on a substrate 27, for example of InP. The active layer 21 is covered with a protective layer 23 of a III-V material such as InP, for example. The buffer layer 22, the active layer 21 and the protective layer 23 form a stack 31 whose thickness I must be sufficient for multiple reflections to occur without problems. The conditions in respect of the thickness I are described hereinafter.

To obtain the multiple reflections, at least two mirrors 24 and 25 are disposed on respective opposite sides of the active layer 21, to be more precise on respective opposite sides of the stack 31. The mirrors are parallel to the active layer 21.

The bottom mirror 25 is deposited after forming a hole 28 in the substrate 27. The hole 28 is formed by chemical etching, for example. In this case, a barrier layer is provided between the buffer layer 22 and the substrate 27. Alternatively, the hole 28 can be formed by a conventional dry etching process. However, in this case, the depth to be etched must not exceed a few hundred micrometers.

The bottom mirror 25 and the top mirror 24 are made of gold or comprise multiple dielectric layers or multiple semiconductor layers (Bragg mirrors). A light spot 26 injected into the saturable absorber 20 is reflected several times between the two mirrors before it exits at a point denoted $(S_1S_2)$. The multiple reflections enable the light wave to pass several times through the active layer 21. The absorber, which includes an absorbing layer 21 with a thickness in the range from 0.1 μm to 0.5 μm and having only 4 to 8 quantum wells, therefore achieves a similar result to conventional saturable absorbers in which the active layer is from 2 μm to 5 μm thick and has 50 to 80 quantum wells. Reducing the thickness of the active layer, and therefore the number, of quantum wells, considerably reduces the cost of manufacturing the saturable absorber.

The overall thickness I of the stack 31 must be sufficient for the multiple reflections to occur without impediment. That thickness is preferably greater than or equal to 2 μm. The angle Δi of the incident beam in air (or Δθ in the InP material) and the illuminated area of the incident beam $(S_1S_2)$ have been calculated from the following parameters, whose values were fixed beforehand: the number r of reflections at one of the mirrors and the overall thickness I of the stack between the two mirrors. In this example, the length m of the top mirror 24 was fixed at 15 μm and the angle of incidence θ at 6°.

The limit value for the angle of incidence θ was calculated at 8° for an absorption difference of less than 1 dB (decibel) between the two modes of polarization of the incident light. This limit value imposes an upper limit equal to Δθ=2° for the angle in the material. Consequently, if the angle of incidence θ is small, i.e. below the limit value of 8°, the sensitivity of the absorber to the polarization of the light being less than 1 dB, the saturable absorber is deemed to be insensitive to the polarization. On the other hand, if the reflection angle θ increase and becomes greater than 8°, the sensitivity to polarization increases and can no longer be neglected.

The value of the angle of incidence θ can be determined from the following equation:

$$\theta = \text{Arctan}\left[\frac{m}{2(r-2)l}\right] - \text{Arctan}\left[\frac{m}{2rl}\right]$$

The area illuminated by the incident beam $S_1S_2$ depends on the angle θ, on the length m of the top mirror 24, on the overall thickness I of the stack 31 and on the number r of reflections. It is more particularly determined from the following equation:

$$S_1S_2 = [rl\tan\theta - m] \times \frac{\cos(\theta - \Delta\theta)}{\cos(\theta + \Delta\theta)}$$

The following table summarizes a few examples of combinations of parameters when the length m of the top mirror 24 is fixed at 15 μm and the angle θ at 6°.

| r | l (μm) | Δθ (°) | Δi (°) | $S_1S_2$ (μm) |
|---|---|---|---|---|
| 15 | 2 | 1 | 3.2 | 2.1 |
| 8 | 5 | 1.7 | 5.4 | 2.5 |
| 6 | 9 | 1.9 | 6.1 | 2.8 |

The size of the light spot $(S_1S_2)$ is preferably in the order of 2 μm to 3 μm. If the spot is too large, part of the light is masked, and the saturable absorber.is less effective. Too small a spot size is also undesirable because it is not possible to focus a light beam to a spot smaller than its wavelength. The size of the light spot $(S_1S_2)$ therefore imposes a lower limit value on the overall thickness I of the stack 31. This lower limit is equal to 2 μm.

FIG. 4b is a diagram showing a variant of the active part of the above multiple reflection saturable absorber. In this variant, the bottom mirror 25 is very thick. Its thickness is typically in the range from 5 μm to 10 μm for a semiconductor Bragg mirror, in the range from 1 μm to 3 μm for a dielectric $(SiO_xN_y)$ Bragg mirror, or in the range from 0.1 μm to 1 μm for a metal mirror. In the latter case, a thick metal mirror (more than 1 μm thick) serves as a heatsink. A thick mirror serves as a heatsink because it evacuates the heat generated by the agitation of the electrons created from the photons.

FIG. 4c is a diagram showing another variant of the active part of the above multiple reflection saturable absorber. In this variant, the bottom mirror 15 is also very thick to serve as a heatsink. This variant represents a situation in which the angle of incidence θ is greater than 8° and sufficiently large for the saturable absorber 20 to be sensitive to the polarization of the light. In this case, an external device 30 for reversing the polarization is used to produce a saturable absorber that is not polarization sensitive. The external device 30 is placed between two top mirrors 24, 29. The light wave is therefore reflected several times between the bottom mirror 25 and the first top mirror 24 during a first pass through the absorber. During this first pass through the absorber, one light polarization mode, for example the TE mode, is privileged relative to the other mode, i.e. is absorbed more by the active layer 21. The light wave is then processed by the external device 30 i.e. its polarization is reversed, after which it is injected into the saturable absorber 20 again to undergo further reflections between the bottom mirror 25 and the second top mirror 29 during a second pass through the absorber. During the second pass through the absorber, because the polarization of the light has been reversed, it is the other polarization mode (the TM mode in this example) which is privileged. This balances the absorption of the light polarization modes and renders the saturable absorber insensitive to the polarization of the light.

As a further improvement to the saturable absorber 20, a semiconductor optical amplifier can be added to the external device 30. This amplifier amplifies the light that was absorbed during the first pass through the absorber in order

TABLE I

| Sample | Growth temperature | GaAs doping (cm⁻³) | Lattice mismatch between GaAs and InP | Mid-height width of excitonic line | Position of dislocations reative to active layer |
|---|---|---|---|---|---|
| 1 | 450° C. | $5.10^{18}$ n | + + | + + + | 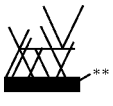 |
| 2 | 450° C. | $10^{18}$ n | + + + | + + | 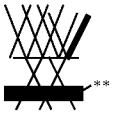 |
| 3 | 450° C. | $10^{18}$ p | + | + | 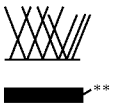 | to maintain the same power level both times the light is injected into the absorber.

The multiple reflection saturable absorber just described is more particularly suitable for use in the second regenerator of the invention shown in FIG. 2.

What is claimed is:

1. A device for regenerating a wavelength-division multiplex optical signal, comprising:
    a dispersive medium for receiving the wavelength-division multiplex signal and emitting a corresponding dispersed wave into a free space, and
    a saturable absorber disposed to receive said dispersed wave on a first face and to transmit a corresponding regenerated wave,
    wherein the dispersive medium is arranged so that said emitted dispersed wave is focused on to the saturable absorber at points which differ according to the wavelengths of the multiplex optical signal.

2. A device as claimed in claim 1, further comprising another dispersive medium for recombining the dispersed and regenerated wave at the exit from said saturable absorber.

3. The device claimed in claim 1, wherein said dispersive medium comprises, or said dispersive media comprise, a set of two lenses on respective opposite sides of a grating.

4. The device claimed in claim 1, wherein said saturable absorber includes a ternary material active layer with multiple quantum wells deposited on a substrate.

5. The device claimed in claim 1, wherein said saturable absorber has a reflective coating on a second face and a spatial separator separates the optical signal to be regenerated from the regenerated signal.

6. The device claimed in claim 1, wherein the crystal structure of said active layer of said saturable absorber has a controlled density of dislocations.

7. The device claimed in claim 6, wherein said saturable absorber has a top layer which has a lattice mismatch with a III-V protective material layer covering said active layer.

8. The device claimed in claim 7, wherein said top layer is of GaAs.

9. The device claimed in claim 7, wherein said top layer is deposited to a thickness greater than 0.1 µm.

10. The device claimed in claim 7, wherein said protective layer has a thickness in the range from 0 up to 1 µm.

11. The device claimed in claim 7, wherein said top layer is doped with n-type carriers to a concentration in the range from 0 up to $4.10^{18}$ cm⁻³.

12. The device claimed in claim 1, wherein said saturable absorber includes at least two mirrors on respective opposite sides of said active layer and parallel to said active layer.

13. The device claimed in claim 12, wherein said active layer is deposited on a buffer layer and covered with a III-V material protective layer and the stack formed by the aforementioned three layers has an overall thickness I greater than or equal to 2 µm.

14. The device claimed in claim 12, wherein the thickness of said active layer of the saturable absorber is in the range from 0.1 µm to 0.5 µm.

15. A device for regenerating a wavelength-division multiplex optical signal, comprising:
    a dispersive medium for receiving the wavelength-division multiplex signal and emitting a corresponding dispersed wave into a free space, and
    a saturable absorber disposed to receive said dispersed wave on a first face and to transmit a corresponding regenerated wave,
    wherein said optical signal is composed of a plurality of spectral channels, each channel resulting from power modulation of a corresponding carrier wave having an associated wavelength, and
    wherein the dispersive medium is arranged so that said emitted dispersed wave is focused on to the saturable absorber at points which differ according to the wavelengths of the multiplex optical signal.

16. A device for regenerating a wavelength-division multiplex optical signal, comprising:
    a dispersive medium for receiving the wavelength-division multiplex signal and emitting a corresponding dispersed wave into a free space;
    a saturable absorber disposed to receive said dispersed wave on a first face and to transmit a corresponding regenerated wave; and
    another dispersive medium for recombining the dispersed and regenerated wave at the exit from said saturable absorber.

17. A device for regenerating a wavelength-division multiplex optical signal, comprising:
    a dispersive medium for receiving the wavelength-division multiplex signal and emitting a corresponding dispersed wave into a free space; and
    a saturable absorber disposed to receive said dispersed wave on a first face and to transmit a corresponding regenerated wave,
    wherein said dispersive medium comprises, or said dispersive media comprise, a set of two lenses on respective opposite sides of a grating.

* * * * *